US009670562B2

(12) United States Patent
Tamiya

(10) Patent No.: US 9,670,562 B2
(45) Date of Patent: Jun. 6, 2017

(54) METAL SUBSTRATE FOR FIXING MEMBER, MANUFACTURING METHOD THEREFOR, FIXING MEMBER, AND FIXING ASSEMBLY

(71) Applicant: CANON KABUSHIKI KAISHA, Tokyo (JP)

(72) Inventor: Hirotomo Tamiya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 300 days.

(21) Appl. No.: 14/290,056

(22) Filed: May 29, 2014

(65) Prior Publication Data

US 2014/0363693 A1 Dec. 11, 2014

(30) Foreign Application Priority Data

Jun. 6, 2013 (JP) ................................ 2013-119895

(51) Int. Cl.

| | |
|---|---|
| ***B32B 15/01*** | (2006.01) |
| ***C21D 7/13*** | (2006.01) |
| ***G03G 15/20*** | (2006.01) |
| ***C21D 6/00*** | (2006.01) |

(52) U.S. Cl.

CPC ............... *C21D 7/13* (2013.01); *C21D 6/004* (2013.01); *G03G 15/2057* (2013.01); *C21D 2211/001* (2013.01); *C21D 2211/008* (2013.01); *G03G 2215/2048* (2013.01); *Y10T 428/12549* (2015.01); *Y10T 428/12965* (2015.01)

(58) Field of Classification Search

None

See application file for complete search history.

(56) References Cited

U.S. PATENT DOCUMENTS 5,376,464 A * 12/1994 Dupoiron ............ B23K 20/227 148/534
2012/0012230 A1* 1/2012 Tamiya ............... B21D 22/125 148/320

FOREIGN PATENT DOCUMENTS

JP 2010-54821 A 3/2010

OTHER PUBLICATIONS

U.S. Appl. No. 14/693,016, filed Apr. 22, 2015, Tamiya.

* cited by examiner

*Primary Examiner* — Daniel J Schleis
(74) *Attorney, Agent, or Firm* — Fitzpatrick, Cella, Harper & Scinto

(57) ABSTRACT

The present invention relates to a metal substrate for a fixing belt, having excellent durability. The metal substrate for a fixing belt of the present invention including an austenite stainless steel including a martensite phase includes: a region of austenite stainless steel including a martensite phase, with a nickel content of 8 mass % or more, sandwiched between regions of austenite stainless steel including a martensite phase, with a nickel content less than 8 mass %, in the thickness direction.

14 Claims, 4 Drawing Sheets

METAL SUBSTRATE FOR FIXING MEMBER, MANUFACTURING METHOD THEREFOR, FIXING MEMBER, AND FIXING ASSEMBLY

BACKGROUND OF THE INVENTION

Field of the Invention

The present invention relates to a metal substrate for use as the substrate for a fixing member for use in a fixing assembly of an electrophotographic image forming apparatus, in particular, a metal substrate for use as the substrate for a fixing member which effectively prevents the breakage or damage of the fixing member, and a fixing member and a fixing assembly which use the metal substrate.

Description of the Related Art

An electrophotographic image forming apparatus includes a heat fixing assembly which employs a belt heating system for reducing power consumption. FIG. 2 is a cross sectional view of a heat fixing assembly illustrating a skeleton framework of a typical belt heating system. The heat fixing assembly includes a fixing belt 11 as a fixing member in an endless form, a pressure roller 20 as a pressure member disposed opposite to the fixing member, and a ceramic heater 12 as a heating means disposed in contact with the inner peripheral surface of the fixing belt. The fixing belt 11 and the pressure roller 20 form a fixing nip N. A recording material 30 on which an unfixed toner image T is formed and supported is introduced in the fixing nip part N. The toner is fused so that the toner image is fixed on the recording material 30.

FIG. 3 is a cross sectional view illustrating a fixing belt 11. The fixing belt 11 mainly includes 3 layers including a substrate 101, an elastic layer 102, and a surface layer 103 such as a releasing layer in this order from the side of a ceramic heater 12. A thin metal seamless belt having high thermal conductivity is used as the substrate 101.

In order to obtain a satisfactory fixed image in such a belt heating system, it is necessary to stably form a sufficient fixing nip part N. Accordingly, the fixing belt 11 for use is slid on the ceramic heater 12 under approximately uniform pressure between the ceramic heater and the pressure roller 20 along the longitudinal direction, i.e. the axial direction of the cylindrical fixing belt.

The fixing belt 11 in such a use may be subject to scratching and the development of perforations due to pressure applied to a small region, when fine foreign matter such as dust and sand intrude into the interior of the main unit so as to be held between the ceramic heater 12 and the substrate 101 in the fixing nip part N. The occurrence of scratching and perforations may cause breakage of the fixing belt 11 during repeated use, thus being the cause of the breakage.

According to a proposal in Japanese Patent Application Laid-Open No. 2010-54821, the surface of a ceramic heater in contact with a fixing belt is provided with a bump inside the end of the fixing belt in the longitudinal direction so as to prevent the dust and sand from intruding into the interior.

For further reduction in power consumption, thinning of a fixing member, in particular, thinning of a metal substrate, is required. When the metal substrate for a fixing belt is thinned to, for example, 30 μm or less, the occurrence of fracture and dents is predicted at the bump provided on the surface of a ceramic heater described in the Japanese Patent Application Laid-Open No. 2010-54821.

The present inventor recognizes that in the fixing member with a metal substrate having a thickness of 30 μm or less, the metal substrate itself needs to have more enhanced scratching resistance and perforation resistance under the pressure to be applied to a small region when invaded with fine foreign matter such as dust and sand.

SUMMARY OF THE INVENTION

The present invention is directed to providing a metal substrate for a fixing member which is resistant against scratching on the surface and also against the development of through-holes under a high pressure applied to a small region, or has high "strength against piercing", and the invention is also directed to proving a method of manufacturing the same.

The present invention is also directed to providing a fixing member having excellent durability.

Furthermore, the present invention is directed to providing a fixing assembly which is able to form high-quality electrophotographic images over a long period of time.

According to an aspect of the present invention, there is provided a metal substrate for a fixing member, comprising an austenite stainless steel including a martensite phase, and in the thickness direction of the metal substrate, a region of an austenite stainless steel comprising a martensite phase, with a nickel content of 8 mass % or more is sandwiched between regions of an austenite stainless steel each comprising a martensite phase, with a nickel content less than 8 mass %.

According to another aspect of the present invention, there is provided a fixing member comprising the metal substrate.

According to a further aspect of the present invention, there is provided a fixing assembly comprising the fixing member, a pressure member disposed opposite to the fixing member, and a heating means for the fixing member.

According to a still another aspect of the present invention, there is provided a method of manufacturing a metal substrate for a fixing member, wherein: said metal substrate comprises a layer comprising an austenite stainless steel comprising a martensite phase, with a nickel content of 8 mass % or more, and a layer of an austenite stainless steel comprising a martensite phase, with a nickel content less than 8 mass %, and has a laminated structure in which the austenite stainless steel layer comprising a martensite phase, with a nickel content of 8 mass % or more is sandwiched between two of the austenite stainless steel layers each comprising a martensite phase, with a nickel content less than 8 mass %; wherein said method comprises plastic working a laminated austenite stainless steel product having a laminated structure comprising an austenite stainless steel plate with a nickel content of 8 mass % or more sandwiched between austenite stainless steel plates with a nickel content less than 8 mass %, and generating a martensite phase in the austenite stainless steel of the laminated austenite stainless steel product.

Further features of the present invention will become apparent from the following description of exemplary embodiments with reference to the attached drawings.

DESCRIPTION OF THE EMBODIMENTS

Figure 1A:
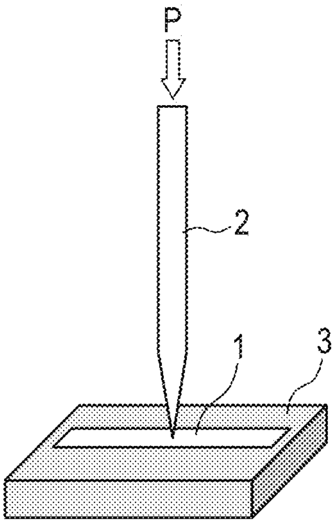
FIG. 1A is a diagram illustrating a method for measuring strength against piercing.

Preferred embodiments of the present invention will now be described in detail in accordance with the accompanying drawings.

The present inventor found that a metal substrate formed by plastic working a laminated steel plate including austenite stainless steels with different nickel contents which has different martensitic transformation rates in the thickness direction has both high surface hardness and high strength against piercing. The present invention was completed based on the new findings by the inventor.

The metal substrate for a fixing member in an endless belt shape in an aspect of the present invention (hereinafter referred to as “fixing belt” in some cases), the method for manufacturing the same, and a fixing belt using the metal substrate are described in sequence in the following.

<Metal Substrate and Manufacturing Method for the Same>

The metal substrate for a fixing belt of the present invention can be manufactured by a method including the following steps.

(1) A cup-shaped member is obtained by drawing a stainless steel plate, i.e. by plastic working. The thickness of the stainless steel plate before drawing can be 1.0 mm or less, in particular, 0.2 mm or more and 0.5 mm or less.

(2) The cup-shaped member obtained in the step (1) is heat treated, so that the strain imparted to the cup-shaped member in drawing can be removed.

(3) The strain-free cup-shaped member obtained in the step (2) is made thinned by plastic working at a working rate of 40% or more, and the bottom of the thinned cup-shaped member is cut off, so that a metal seamless belt having a thickness of 0.05 mm or less is obtained.

In manufacturing the metal substrate of the present invention, a laminated steel plate of an austenite stainless steel plate with a nickel content less than 8 mass % and an austenite stainless steel plate with a nickel content of 8 mass % or more is used as a raw material.

In general, an austenite stainless steel has the following composition:

C: 0.01 to 0.15 mass %;

Si: 0.01 to 1.00 mass %;

Mn: 0.01 to 2.00 mass %;

Ni: 6.00 to 15.00 mass %;

Cr: 15.00 to 20.00 mass %; and

Balance: Fe and inevitable impurities.

Examples of the inevitable impurities include P which may be contained in an amount of 0.045 mass % or less and S which may be contained in an amount of 0.030 mass % or less.

Examples of the austenite stainless steel plate with a nickel content of 8 mass % or more include SUS 304.

In general, the SUS 304 has the following composition as described in the Japanese Industrial Standard (JIS) G 4305 (2010):

C: 0.01 to 0.08 mass %;

Si: 0.01 to 1.00 mass %;

Mn: 0.01 to 2.00 mass %;

Ni: 8.00 to 10.50 mass %;

Cr: 18.00 to 20.00 mass %; and

Balance: Fe and inevitable impurities.

Examples of the inevitable impurities include P which may be contained in an amount of 0.045 mass % or less and S which may be contained in an amount of 0.030 mass % or less, as described above.

The metastable austenite stainless steel plate typified by SUS 304 has excellent formability, allowing for relatively easy thinning by plastic working. Due to work hardening after plastic working, the metastable austenite stainless steel plate has excellent durability as a metal substrate for a fixing member. Furthermore, the metastable austenite stainless steel plate is not readily oxidized with less changes over time in the environment in a heat fixing assembly and is suitable for use as a raw material for metal substrate for a fixing member. It is known that plastic working at room temperature allows a metastable austenite stainless steel to cause deformation-induced martensitic transformation, so that the austenite structure before plastic working can be transformed into the martensite structure having high hardness.

As an index for indicating the stability of austenite against plastic working, $Md_{30}$ can be obtained from the following expression 1 based on the contents of chemical components of the material. $Md_{30}$ represented in the unit of (° C.) is referred to as austenite stabilization index. The larger the value in plus direction is, the lower the stability of the austenite becomes, resulting in a larger amount of the martensitic transformation after plastic working.

$$Md_{30}=551-462(C+N)-9.2Si-8.1Mn-13.7Cr-29Ni-18.5Mo-68Nb \quad \text{(Expression 1)}$$

As the contents of chemical components of the material in the expression 1, the measured values by glow discharge emission spectrometric analysis may be used. In the measurement, “GD-PROFILER 2” (made by Horiba, Ltd.) may be used.

The hardness of a plastic formed stainless steel increases in proportion to the amount of martensitic transformation. Accordingly, a steel species having a large $Md_{30}$ is selected as a steel material for constituting the surface of a substrate, which is processed according to the steps (1) to (3). Consequently, the metal substrate for a fixing member having high surface hardness can be obtained.

As a result of investigation by the present inventor, it was found that the improvement in the tension strength and fracture elongation of the raw material is required against the pressure applied to a small region of the substrate of a fixing belt, so as to enhance the strength against piercing. A stainless steel with a sufficient amount of deformation-induced martensitic transformation by plastic working may, however, become embrittled, having low strength against piercing with reduced fracture elongation in some cases, while having high tension strength.

Figure 1B:
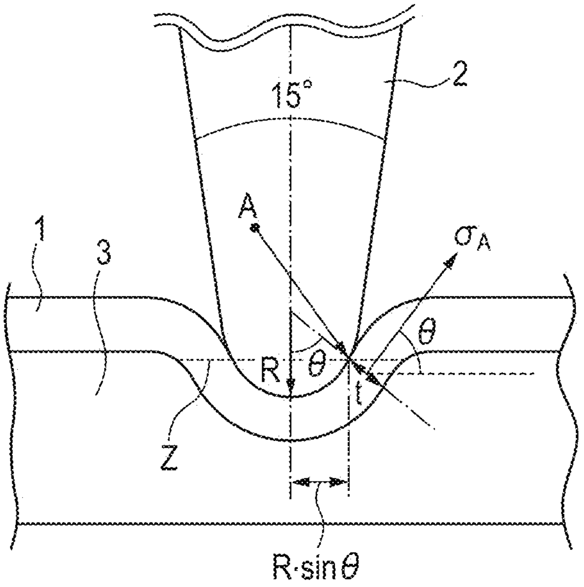
FIG. 1B is an enlarged partial cross sectional view illustrating the vicinity of a piercing tip during measurement of strength against piercing.

With reference to FIGS. 1A and 1B, the concept of strength against piercing is more specifically described below. FIG. 1A is a diagram illustrating a metal seamless belt 1 in a strip shape disposed on a urethane rubber plate 3. The inner side of the metal seamless belt 1 in a strip shape is directed to the side of a protrusion 2. FIG. 1B is an enlarged partial cross sectional view illustrating the metal seamless belt 1 and the piercing tip of the protrusion 2 having tip radius R.

As illustrated in FIG. 1B, when the protrusion 2 having tip radius R pierces the metal seamless belt 1 in a strip shape having thickness t, a region A is farthest from the tip of the protrusion 2 in the contact part between the metal seamless belt 1 in a strip shape and the protrusion 2. With $\sigma_A$ representing tensile stress at the region A, and θ representing the angle formed between the tangent line for the protrusion 2 and the axial line of the metal seamless belt 1, a piercing load P can be described as follows.

As illustrated in FIG. 1B, R·sin θ represents the radius of a circular cross section of the protrusion 2 at the region A, and t represents the thickness of the metal seamless belt 1 in a strip shape. The cross sectional area of the metal seamless belt 1 in a strip shape at the region A illustrated by a dashed line part Z is represented by: $\pi\cdot(R\cdot\sin\theta+t/\sin\theta)^2-\pi\cdot(R\cdot\sin\theta)^2=2\pi\cdot R\cdot t+t^2/\sin^2\theta$. With omission of $t^2/\sin^2\theta$ due to the smallness compared to $2\pi\cdot R\cdot t$, the cross sectional area of the metal seamless belt 1 at the region A can be represented by $2\pi\cdot R\cdot t$.

As illustrated in FIG. 1B, with $\sigma_A$ representing tensile stress at the region A of the metal seamless belt, the stress applied in the vertical direction in FIG. 1B is represented by $\sigma_A\cdot\sin\theta$. Accordingly, the load P applied to the metal seamless belt 1 by the protrusion 2 is approximately represented by $P=2\cdot\pi\cdot R\cdot t\cdot\sigma_A\cdot\sin\theta$. Typically, there exists friction at the contact surface between the tip of the protrusion 2 and the metal seamless belt 1 in a strip shape. When the protrusion 2 is deeply pressed, however, the contacted region A having little effect of friction allows a large tensile stress to apply to the interior of the metal seamless belt 1, resulting in fracture of the material. With σ representing the stress at the fracture, the value of σ equals to the fracture strength of the material of a metal seamless belt, i.e. the tensile stress $\sigma_A$ at the region A.

With a large fracture elongation for the metal seamless belt 1 in a strip shape at fracture, the protrusion 2 can be further deeply pressed until the $\sigma_A$ reaches the stress σ at fracture, compared to the case with a small fracture elongation. In other words, the angle θ formed between the tangent line for the protrusion 2 and the axial line of the metal seamless belt 1 at the region A increases as the fracture elongation increases.

Accordingly, in order to improve the piercing load for a large load P, the tension strength $\sigma_A$ and angle θ, i.e. the fracture elongation, should be increased based on the approximate expression of the load P: $P=2\cdot\pi\cdot R\cdot t\cdot\sigma_A\cdot\sin\theta$.

On the right side of the approximate expression of the load P, $2\cdot\pi\cdot R\cdot t$ is a constant, while $\sigma_A\cdot\sin\theta$ is a variable unique to the material of a metal seamless belt. With a piercing resistance τ representing the variable $\sigma_A\cdot\sin\theta$ having a unit in ($N/mm^2$), the approximate expression of the load P is represented by: $P=2\cdot\pi\cdot R\cdot t\cdot\tau$. It is indicated that the strength against piercing can be increased by increasing the piercing resistance τ.

A metastable austenite stainless steel is an alloy having the largest amounts of chromium and nickel. Chromium is an essential component for improvement in corrosion resistance of stainless steel, while nickel is a component for stabilizing an austenite phase. As indicated in the expression of $Md_{30}$, the nickel content has large effect on the amount of martensitic transformation.

An austenite stainless steel based on the Japanese Industrial Standard (JIS) G 4305 (2010), in particular, with a nickel content less than 8 mass %, has a large amount of deformation-induced martensitic transformation by plastic working. Consequently, the stainless steel produced by plastic working the austenite stainless steel through the steps (1) to (3) described above has high surface hardness with low fracture elongation, resulting in low piercing resistance.

On the other hand, a metal substrate produced by plastic working the austenite stainless steel plate having a nickel content of 8 mass % or more has a relatively stable austenite phase with relatively less reduction in fracture elongation, resulting in high piercing resistance with reduced hardness.

The present inventor investigated the use of a laminated steel plate including two types of stainless steel having different amounts of deformation-induced martensitic transformation as a raw material for the metal substrate of a fixing member. More specifically, a stainless steel having a relatively small amount of deformation-induced martensitic transformation (SUS 304L) was sandwiched between stainless steels having a relatively large amount of deformation-induced martensitic transformation (SUS 301) so as to prepare a laminated steel plate with a 3-layer structure. From the laminated steel plate, a metal substrate was prepared by plastic working through the steps (1) to (3). Consequently, a metal substrate having both the high surface hardness and the high piercing resistance was produced.

With the metal substrate, a fixing belt substrate is resistant against scratching and perforation in even when foreign matter is inserted between the metal substrate and the heater, so that a fixing belt which effectively prevents destruction or breakage can be provided.

It is presumed that the metal substrate exhibits high piercing resistance for the following reasons. The load can be dispersed by the surface-side region having high hardness with a large amount of deformation-induced martensitic transformation. In addition, an intermediate region located at the center in the thickness direction of the metal substrate, exhibiting high toughness due to the smaller amount of deformation-induced martensitic transformation compared to that of the surface region, deforms as illustrated in FIG. 1B so as to absorb the dispersed load.

Figure 6:
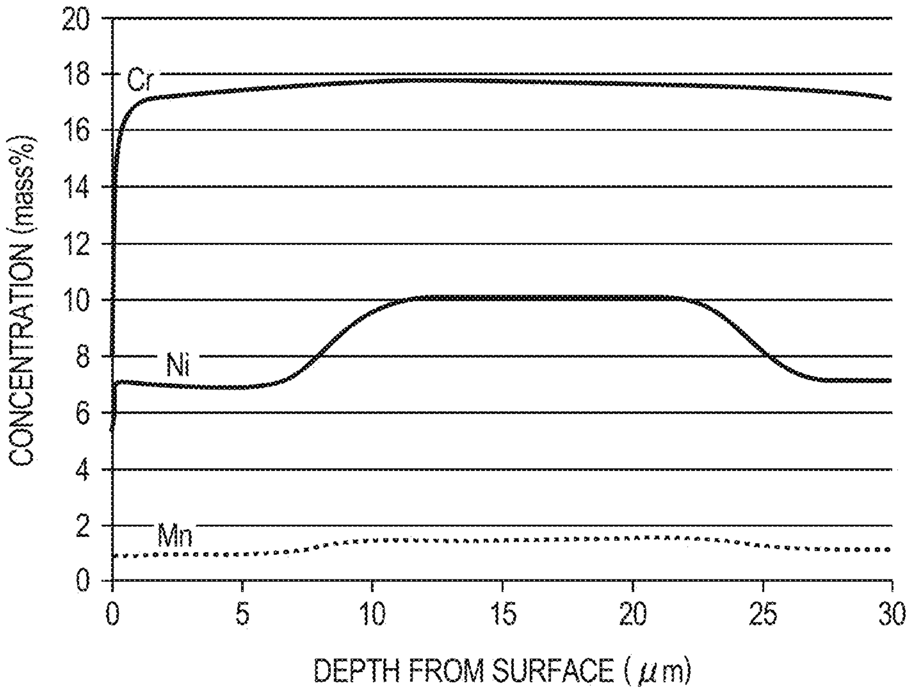
FIG. 6 is a diagram illustrating the measurement results of element distribution of a metal seamless belt obtained in an Example in the depth direction from the outer peripheral surface by glow discharge emission spectrometric analysis.

Based on the FIG. 6, it is also presumed that the interstitial solid solution elements such as carbon atoms (C) and nitrogen atoms (N) are diffused from the surface region with a high work hardening degree to the interior region having high toughness.

Due to the diffusion of the interstitial solid solution elements toward the central portion in the thickness direction, reduction in the content ratio of the solid solution elements is thus presumed. It is believed that the reduction has an effect of preventing embrittlement of the surface region in plastic working. It is also believed that these phenomena contribute to the effects achieved by the metal substrate of the present invention.

As raw material for the metal substrate for a fixing belt of the present invention, an austenite stainless steel plate is used, having physical properties suitable for plastic working, allowing the metal substrate for a fixing belt to have predetermined physical properties.

In the present invention, a laminate of an austenite stainless steel plate with a nickel content of 8 mass % or more and an austenite stainless steel plate with a nickel content less than 8 mass % is subjected to the processing of the steps (1) to (3).

As the austenite stainless steel for use may be an austenite stainless steel in accordance with the Japanese Industrial Standard (JIS) G 4305 (2010) as described above. More specifically, a steel plate having a SUS number specified as austenite in accordance with the standard may be selected for the purpose of the present invention.

Examples of the austenite stainless steel with a nickel content less than 8 mass % include SUS 301 based on JIS G 4305 (2010). Examples of the austenite stainless steel with a nickel content of 8 mass % or more include SUS 304, SUS 304L, SUS 305, SUS 316, SUS 316L and SUS XM7 in accordance with JIS G 4305 (2010).

As described above, a metastable austenite stainless steel is subject to the deformation-induced martensitic transformation by plastic working so as to form into an austenite stainless steel including a martensite phase. The content of the martensite phase in an austenite stainless steel can be adjusted by the plastic working rate. For example, with a working rate in terms of the thickness of at least 40%, more preferably at least 75%, an austenite stainless steel including a martensite phase can be formed. On the occasion, use of the laminated structure of the austenite stainless steels having different Ni contents allows for plastic working such that the interior in the thickness direction has a lower content of the martensite phase compared to the surface region.

The method of plastic working is not specifically limited. Besides drawing, the method may be properly selected from, for example, rolling, drawing, pressing, ironing and spinning.

The thickness of stainless steel plate before plastic working for forming a martensite phase is preferably 1.0 mm or less, more preferably 0.5 mm or less, for suitable hardness adjustment by working rate of thickness in plastic working. From the same view point, the thickness of a stainless steel plate before plastic working can be 0.2 mm or more.

As described above, a laminate structure of austenite stainless steels having different Ni contents is subjected to plastic working of the steps (1) to (3), so that the metal substrate for a fixing belt of the present invention can be obtained. The produced metal substrate has excellent adhesion at the interface between the respective austenite steel plates having different Ni contents, with a composition change at the interface region.

The laminated steel material for use in manufacturing the metal substrate of the present invention including an austenite stainless steel plate having a nickel content less than 8 mass % and an austenite stainless steel plate having a nickel content of 8 mass % or more can have a laminated structure of 3 layers to 5 layers.

In the case of a laminated 4-layer structure, an austenite stainless steel plate having a nickel content less than 8 mass % and an austenite stainless steel plate having a nickel content of 8 mass % or more can be alternately laminated such that the inner peripheral side of a metal seamless belt is formed of the austenite stainless steel plate having a nickel content less than 8 mass %. The fixing belt can thus have improved scratching resistance on the contact surface with a heater component disposed inside the fixing belt.

In the case of a laminated 5-layer structure, an austenite stainless steel plate having a nickel content less than 8 mass % and an austenite stainless steel plate having a nickel content of 8 mass % or more can be alternately laminated such that the surface side in the thickness direction is formed of the austenite stainless steel plate having a nickel content less than 8 mass %.

The number of layers in the laminated structure of the laminated steel material can be 3 or 5 because warpage is not readily caused in the laminated steel material.

The thickness of the metal substrate after plastic working of the present invention is not specifically limited. A thin metal substrate having 50 μm or less, in particular, 30 μm or less, can exhibit the advantageous effect of the present invention most effectively. The lower limit of the thickness of the metal substrate is not specifically limited. The thickness can be 20 μm or more in view of maintaining the strength for functioning as the metal substrate of a fixing member.

<Fixing Member>

From the metal substrate of the present invention, a fixing member for heat fixing an unfixed toner image can be manufactured. The fixing member for use in heat fixing of unfixed toner image includes a surface in contact with an unfixed toner image and a surface sliding on a heating surface of a heating means.

The fixing member may be in various forms corresponding to the structure of a fixing assembly to which the fixing member is mounted. A form of endless belt for use as a fixing belt is employed in many cases, due to compaction of the location site in a fixing assembly and improved efficiency in fixing treatment.

The metal substrate for a fixing member of the present invention may be directly used for the fixing member. Alternatively, any one of the elastic layer and the releasing layer may be laminated on at least one surface side of the metal substrate, or the elastic layer and the releasing layer may be sequentially laminated on the metal substrate.

The elastic layer may be disposed for more efficiently forming a nip part for uniform pressurization, thus being formed of elastic material such as silicone rubber. More specifically, an elastic layer comprising a cured material of an addition curing type silicone rubber composition can be suitably used.

The releasing layer may be disposed for securing release properties of a toner image surface so as to prevent the occurrence of offsetting on an as-needed basis. Examples of the releasing layer include a layer which comprises a fluoro resin or a fluoro rubber.

Figure 2:
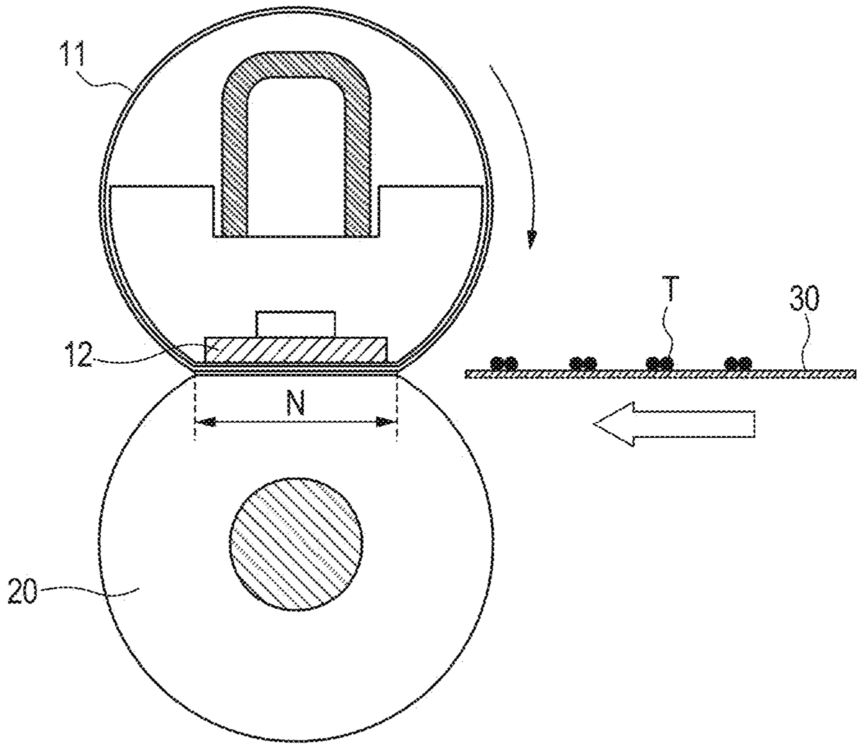
FIG. 2 is a cross sectional view of a heat fixing assembly illustrating a skeleton framework of a belt heating system.
Figure 3:
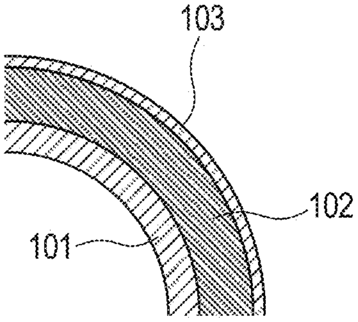
FIG. 3 is a partial cross sectional view illustrating a typical fixing belt.

The fixing member of the present invention may be used as the fixing member of the heat fixing assembly illustrated in FIG. 2. Consequently a heat fixing assembly for forming stable electrophotographic images over a long period of time can be obtained. In other words, the fixing assembly of the present invention includes a fixing member, a pressure member disposed opposite to the fixing member, and a heating means for the fixing member, wherein the fixing member is the fixing member of the present invention. Examples of the heating means include a heater such as ceramic heater.

In the case of a fixing member in an endless form including at least one of the elastic layer and the releasing layer laminated on the metal substrate, the heater may be disposed in direct or indirect contact with the metal substrate of the fixing member. On the occasion, the face of the metal substrate opposed to the heater may be provided with a sliding layer (not illustrated in drawing) which comprises polyimide or the like.

Furthermore, the image forming apparatus of the present invention which comprises the fixing assembly can form high-quality electrophotographic images over a long period of time.

The present invention can provide a metal substrate for a fixing member, which has more improved scratch resistance and perforating resistance. Further, the present invention can provide a fixing member which has more durability. Furthermore, the present invention can provide a fixing assembly which can form high-quality electrophotographic images over a long period of time.

EXAMPLES

Example 1

As a raw material stainless steel plate for a metal substrate of the present Example, a laminated steel plate was prepared which had an austenite stainless steel plate with a nickel content of 8 mass % or more which was sandwiched between austenite stainless steel plates with a nickel content less than 8 mass % from both sides.

The method of manufacturing the laminated steel plate is described in the following. Firstly, on both sides of an austenite stainless steel plate with a thickness of 3.0 mm having a Ni content of 8 mass % or more, austenite stainless steel plates with a thickness of 1.5 mm having a Ni content less than 8 mass % were laminated. Subsequently, a rolled clad material with a thickness of 0.6 mm was prepared by hot rolling. The oxidized scale of the produced rolled clad material was removed by pickling and the strain was removed by annealing. A rolled clad material with a thickness of 0.22 mm was then made by cold rolling.

The rolled clad material was used as raw material laminated austenite stainless steel for manufacturing a metal substrate.

As the austenite stainless steel with a nickel content less than 8 mass %, SUS 301 based on JIS G 4305 (2010) was used. As the austenite stainless steel with a nickel content of 8 mass % or more, SUS 304L based on JIS G 4305 (2010) was used. The austenite stainless steel with a nickel content of 8 mass % or more is not limited to the steel species, allowing the use of an austenite stainless steel with a nickel content of 8 mass % or more in accordance with the Japanese Industrial Standard (JIS) G 4305 (2010). In Table 1, chemical components of the two types of austenite stainless steel for use in the present Examples are shown in mass %.

TABLE 1

| | Chemical component (mass %) | | | | | | | |
|---|---|---|---|---|---|---|---|---|
| | C | Si | Mn | P | S | Ni | Cr | Fe, and the like |
| SUS304L | 0.008 | 0.67 | 1.42 | 0.04 | 0.002 | 10.1 | 18.21 | Bal |
| SUS301 | 0.09 | 0.59 | 0.96 | 0.03 | 0.002 | 5.96 | 17.15 | Bal |

Bal (Balance): Residue other than the elements described in Table 1, including iron and inevitable impurities.

Subsequently, a metal substrate in an endless belt shape was made from the rolled clad material by the following method.

Figure 4A:
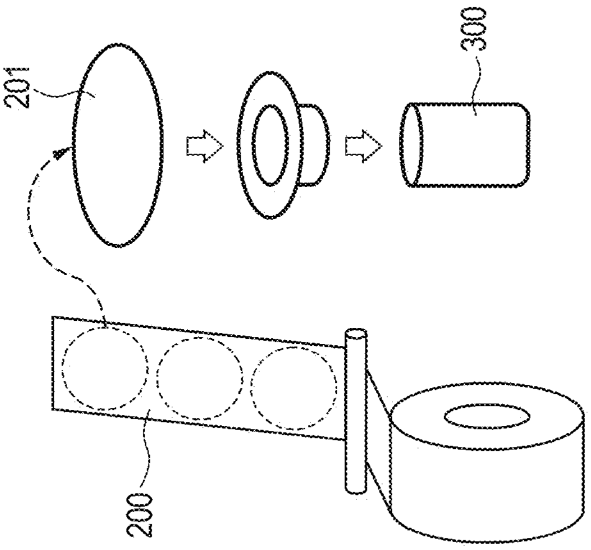
FIG. 4A is a process diagram illustrating the process of drawing to obtain a cup-shaped member from a stainless steel plate.
Figure 4B:
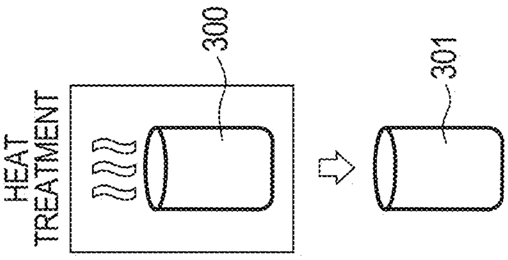
FIG. 4B is a diagram illustrating the process of heat treating a cup-shaped member.
Figure 4C:
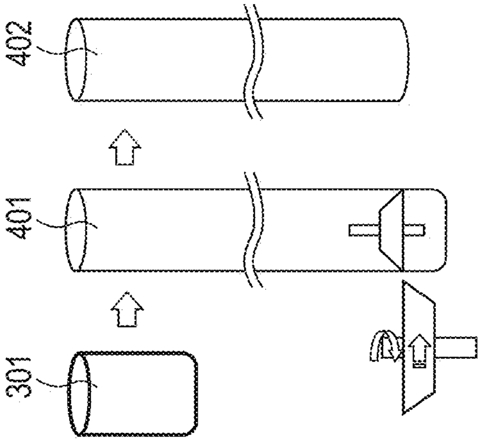
FIG. 4C is a process diagram illustrating the process of thinning for obtaining a metal seamless belt from a cup-shaped member.

FIGS. 4A, 4B and 4C are process diagrams illustrating the method of manufacturing a metal substrate 402 in an endless belt shape of the present invention. Firstly, a disc-shaped member 201 was stamped out from the rolled clad material with a thickness of 0.22 mm. Subsequently, a cup-shaped member 300 with a sidewall thickness of 0.20 mm was obtained by several drawing steps (refer to FIG. 4A). Subsequently, as illustrated in FIG. 4B, the cup-shaped member 300 was heat treated to remove the strain imparted in the drawing, so that a cup-shaped member 301 was obtained. In the present Example, temperature was maintained at 1050° C. for a predetermined time period and then rapidly lowered to room temperature. In the cup-shaped member 301 with strain removed, the surface-side region with a Ni content less than 8 mass % had an $Md_{30}$ of 106, while the sandwiched region with a Ni content of 8 mass % or more had an $Md_{30}$ of −33, obtained from the expression 1, respectively.

The reason for the difference in the value of $Md_{30}$ for the respective regions and for SUS 304L and SUS 301 described in Comparative Examples to be described may be considered as follows. In the process of forming the rolled clad material, due to mutual diffusion of elements between SUS 304L and SUS 301, it is believed that the composition ratio at the interface was changed to a ratio different from the composition ratio of SUS 304L and the composition ratio of SUS 301.

Finally, as illustrated in FIG. 4C, the cup-shaped member 301 obtained in the step was gradually thinned by several times of ironing, so that a thinned cup-shaped member 401 was obtained, with a gross ironing rate of 85%. Subsequently the bottom was cut off to obtain a metal endless belt 402 with a thickness of 0.03 mm.

FIG. 6 is a diagram illustrating the measurement results of element distribution of a metal endless belt 402 obtained in the Example in the depth direction from the outer peripheral surface by glow discharge emission spectrometric analysis. As an apparatus for the measurement, “GD-PROFILER 2” (made by Horiba, Ltd.) was used. In the measurement, the measurement surface was cleaned with ethanol. The discharge area had a diameter of 4 mm. It was proved based on the distribution of the Ni contents that the thus obtained metal seamless belt 402 had a region with a Ni content of 8 mass % or more sandwiched between regions with a Ni content less than 8 mass %. In addition, it was proved that the laminated steel plate was thinned while preserving the thickness ratio of the respective steel plates before making the laminated steel plate. Furthermore, the atoms (Ni, Cr and Mn) measured at the interface of the respective layers exhibit continuous changes in concentration.

—Evaluation Method—

(Measurement of Strength Against Piercing)

Figure 5A:
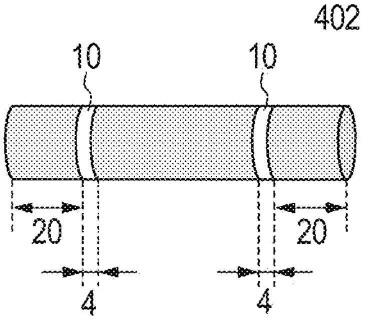
FIG. 5A is a diagram illustrating the position for cutting out a ring-shaped member from a metal seamless belt.
Figure 5B:
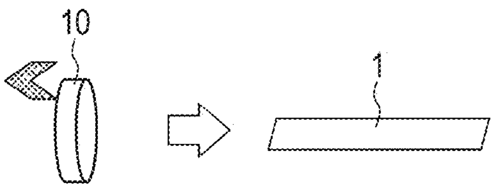
FIG. 5B is a diagram illustrating a method for making a strip-shaped specimen from a cut-out ring-shaped member.

FIGS. 5A and 5B are diagrams illustrating the method for obtaining a specimen for the strength against piercing measurement of the produced metal seamless belt. A ring-shaped member 10 having a width of 4 mm was cut out from the obtained metal seamless belt 402 at a position from 20 mm from either end as illustrated in FIG. 5A. Subsequently the ring-shaped member 10 was cut open to form a specimen in a strip shape of the metal seamless belt 1, as illustrated in FIG. 5B.

FIGS. 1A and 1B are diagrams illustrating a method for measuring strength against piercing. As illustrated in FIG. 1A, the metal seamless belt 1 in a strip shape obtained by the method was disposed on a urethane rubber plate 3 such that the inner peripheral surface side of the metal seamless belt was directed to a protrusion 2. A load P was applied to the surface by the protrusion 2, so that the maximum load before piercing was measured. The protrusion 2 is made from an ultra-hard material, having a spherical head with a radius R of 0.05 mm at the tip. The tip of the protrusion 2 was gradually approached and contacted with a metal seamless belt 1. After application of a load of 0.1 N, the tip was pressed at a rate of 0.1 mm/sec until a bore was made. The measurement was performed 5 times for one specimen at different measurement spots approximately equally spaced. Two pieces of sample cut out from both ends, respectively, were measured. The arithmetical mean for the total 10 measurement data was calculated. The value represents the piercing resistances. The urethane rubber plate for use had a shore hardness A of 70, with a 50 mm square shape with a thickness of 5 mm.

(Hardness Measurement)

The method for measuring hardness is described in the following. The hardness measurement was performed based on Vickers hardness testing method in accordance with JIS Z 2244 (2009). A specimen in a strip shape with a width of 4 mm was cut out in the same way as in the strength against piercing measurement. Subsequently, the surface on the inner peripheral side of a metal seamless belt was polished with a 3-micron grade lapping film to the state that the surface roughness of the measurement surface has no effect on the hardness measurement. The hardness of the polished surface was measured.

As the measurement instrument, "HMV-2 TADW" (trade name, made by Shimadzu Corporation) was used. The measurement load was 980.7 mN. After the measurement load was applied, the load was maintained for 10 seconds. The measurement was repeated 5 times for one specimen at different measurement spots approximately equally spaced. The two pieces of specimens cut out from both ends, respectively, were measured. The arithmetical mean for the total 10 measurement data was calculated. The value represents the surface hardness. All of the measured indentation depth were 3 μm or less, so that the substrate of the specimen had no effect on the measurement data.

(Ferrite Level Measurement)

The method for measuring the ferrite level is described in the following. The ferrite level is an index for easily evaluating the amount of transformation from austenite to martensite by plastic working. In the case of thickness of 2 mm or less, however, the ferrite level decreases depending on the thickness. Accordingly, the ferrite level in the present measurement is used as data for relative comparison of the present Example and Comparative Examples.

As the measurement instrument, "FISCHER SCOPE MMS" (made by Fischer Instruments K.K.) was used. The outer surface of the metal seamless belt 402 illustrated in FIG. 4C was divided into 4 parts approximately equally spaced in axial direction and into 8 parts approximately equally spaced in circumferential direction so as to specify 32 spots in total, at which measurement was performed and the mean value thereof was calculated as the ferrite level.

The metal seamless belt obtained in the Example had a piercing resistance of 718 $N/mm^2$, a surface hardness of 553 (Hv), and a ferrite level of 4.3%.

Comparative Example 1

In the present Comparative Example, a stainless steel plate SUS 304L (with a Ni content of 8 mass % or more) in accordance with JIS G 4305 (2010) was used. The stainless steel plate was cold rolled to a thickness of 0.22 mm and then annealed to produce a tempered material, which was used as the raw material metal seamless belt for the fixing belt in the present Comparative Example 1. The raw material had an $Md_{30}$ of −14, obtained from the expression 1.

From the stainless steel plate, a metal seamless belt for the substrate of a fixing belt was produced. The manufacturing method is the same as that of the Example, so that description is omitted. The metal seamless belt obtained in the present Comparative Example 1 had a piercing resistance of 651 $N/mm^2$, surface hardness of 454 (Hv), and a ferrite level of 3.6%.

Comparative Example 2

In the present Comparative Example, a stainless steel plate SUS 304L (with a Ni content of 8 mass % or more) in accordance with JIS G 4305 (2010) was used. The stainless steel plate was cold rolled to a thickness of 0.30 mm and then annealed to produce a tempered material, which was used as the raw material metal seamless belt for the fixing belt in the present Comparative Example 2. The raw material had an $Md_{30}$ of −22, obtained from the expression 1.

The manufacturing method of a metal seamless belt for the substrate of a fixing belt from the stainless steel plate is described in the following. A cup-shaped member 300 illustrated in FIG. 4A was obtained by the same method as in Example 1. The cup-shaped member 300 had a sidewall thickness of 0.27 mm. Subsequently the cup-shaped member 300 obtained in the step was heat treated so as to remove the strain imparted in the drawing step, so that a cup-shaped member 301 was obtained. In the present Comparative Example, temperature was maintained at 900° C. for a predetermined time period and rapidly lowered to room temperature. Subsequently a metal seamless belt 402 was obtained by the same method as in the Example.

The metal seamless belt obtained in the present Comparative Example had a piercing resistance of 680 $N/mm^2$, surface hardness of 425 (Hv), and a ferrite level of 1.2%.

Comparative Example 3

In the present Comparative Example, an SUS 304 stainless steel plate (with a Ni content of 8 mass % or more) in accordance with JIS G 4305 (2010) was used. The stainless steel plate was cold rolled to a thickness of 0.22 mm and then annealed to produce a tempered material, which was used as the raw material metal seamless belt for the fixing belt in the present Comparative Example 3. The raw material had an $Md_{30}$ of 12, obtained from the expression 1.

From the stainless steel plate, a metal seamless belt for the substrate of a fixing belt was produced. The manufacturing method is the same as that of the Example, so that the description is omitted. The metal seamless belt obtained in the present Comparative Example 3 had a piercing resistance of 688 $N/mm^2$, surface hardness of 496 (Hv), and a ferrite level of 5.4%.

Comparative Example 4

In the present Comparative Example, an SUS 301 stainless steel plate (with a Ni content less than 8 mass %) in accordance with JIS G 4305 (2010) was used. The stainless steel plate was cold rolled to a thickness of 0.30 mm and then annealed to produce a tempered material, which was used as the raw material metal seamless belt for a fixing belt in the present Comparative Example. The raw material had an $Md_{30}$ of 87, obtained from the expression 1.

The manufacturing method for a metal seamless belt for the substrate of a fixing belt from the stainless steel plate is described in the following. A cup-shaped member 300 illustrated in FIG. 4A was obtained by the same method as in the Example. The cup-shaped member 300 had a sidewall thickness of 0.27 mm.

Subsequently, as illustrated in FIG. 4B, the cup-shaped member 300 obtained in the step was heat treated so as to remove the strain imparted in the drawing step, so that a cup-shaped member 301 was obtained. In the present Comparative Example, temperature was maintained at 900° C. for a predetermined time period and rapidly lowered to room temperature. Since the raw material for use in the Comparative Example had a large residual stress in the drawing working and caused a delayed crack, heat treatment was performed immediately after the drawing working. Subsequently a metal seamless belt 402 was obtained by the same method as in the Example. The metal seamless belt obtained in the present Comparative Example 4 had a piercing resistance of 534 N/mm$^2$, a surface hardness of 558 (Hv), and a ferrite level of 16.1%.

In Table 2, the working conditions and measurement results of the Example and Comparative Examples 1 to 4 are described.

TABLE 2

| | Working rate (%) | Heat treatment Temperature (° C.) | Thickness (mm) | Ferrite level (Fe %) | Surface Hardness (Hv) | Piercing resistance (N/mm$^2$) |
|---|---|---|---|---|---|---|
| Example | 85 | 1050 | 0.030 | 4.3 | 553 | 713 |
| Comparative Example 1 | 85 | 1050 | 0.030 | 3.6 | 454 | 651 |
| Comparative Example 2 | 88 | 900 | 0.033 | 1.2 | 425 | 680 |
| Comparative Example 3 | 85 | 1050 | 0.030 | 5.4 | 496 | 688 |
| Comparative Example 4 | 87 | 900 | 0.034 | 16.1 | 558 | 534 |

The working rate in Table 2 means a percentage obtained from the following expression 2, wherein $t_0$ represents the sidewall thickness of the cup-shaped member 301 illustrated in FIG. 4C, and $t_1$ represents the sidewall thickness of the metal seamless belt 402.

$$\text{Working rate}=(t_0-t_1)/t_0\times100(\%) \quad \text{(Expression 2)}$$

The heat treatment temperature in Table 2 represents the temperature at which the cup-shaped member 300 was held during the heating treatment as illustrated in FIG. 4B. The thickness in Table 2 represents the sidewall thickness of the metal seamless belt 402 illustrated in FIG. 4C.

As described in Table 2, in Comparative Examples 1 to 4, the higher the ferrite level is, the higher the surface hardness becomes. The present Example has a ferrite level lower than that of Comparative Example 3, but has an extremely high surface hardness, approximately equal to that of Comparative Example 4. It is presumed that a metal seamless belt having a low ferrite level with high surface hardness was obtained due to the large amount of martensitic transformation in the region on surface side with a Ni content less than 8 mass % and the small amount of martensitic transformation in the region with a Ni content of 8 mass % or more. Comparative Example 4 has high surface hardness with remarkably low piercing resistance. As described above, it is presumed that due to high working rate in the manufacturing step of the fixing belt substrate, the entire metal seamless belt was embrittled, resulting in remarkably low fracture elongation with lowered piercing resistance. As shown in Table 2, the metal seamless belt obtained in the present Example has a piercing resistance of 700 N/mm$^2$ or more and a surface hardness of 550 (Hv) or more, achieving both of high strength against piercing and high surface hardness.

As shown in the Example, the metal substrate of the present invention for use in a fixing member has improved scratching resistance and perforating resistance. In an aspect of the present invention, a metal substrate most suitable for a fixing member, having a strength against piercing $\tau$ of 700 N/mm$^2$ or more and a surface hardness of 550 (Hv) or more, can be obtained by use of the laminated structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-119895, filed Jun. 6, 2013, which is hereby incorporated by reference herein in its entirety.

What is claimed is:

1. A metal substrate for a fixing member, comprising an austenite stainless steel including a martensite phase, wherein:

in a thickness direction of the metal substrate, a region of an austenite stainless steel comprising a martensite phase with a nickel content of 8 mass % or more is sandwiched between regions of an austenite stainless steel each comprising a martensite phase with a nickel content of less than 8 mass %.

2. The metal substrate according to claim 1, comprising a laminated structure in which a layer comprising the martensite phase with the nickel content of 8 mass % or more is sandwiched between two layers each comprising the martensite phase with the nickel content of less than 8 mass %.

3. The metal substrate according to claim 2, wherein the laminated structure is a three-layer structure.

4. The metal substrate according to claim 1, having a thickness of 30 μm or less.

5. The metal substrate according to claim 1, having an endless belt shape.

6. A fixing member comprising the metal substrate according to claim 1.

7. The fixing member according to claim 6, further comprising an elastic layer and a releasing layer laminated on the metal substrate in this order.

8. The fixing member according to claim 7, wherein the elastic layer comprises a silicone rubber.

9. The fixing member according to claim 7, wherein the releasing layer comprises a fluoro resin.

10. A fixing assembly comprising the fixing member according to claim 6, a pressure member disposed opposite to the fixing member, and a heating means for the fixing member.

11. The fixing assembly according to claim 10, wherein the heating means is disposed in direct or indirect contact with the metal substrate of the fixing member.

12. A method of manufacturing a metal substrate for a fixing member, wherein:

said metal substrate comprises a layer comprising an austenite stainless steel comprising a martensite phase, with a nickel content of 8 mass % or more, and a layer of an austenite stainless steel comprising a martensite phase, with a nickel content less than 8 mass %, and has a laminated structure in which the austenite stainless steel layer comprising a martensite phase, with a nickel content of 8 mass % or more is sandwiched between two of the austenite stainless steel layers each comprising a martensite phase, with a nickel content less than 8 mass %; wherein:

said method comprises steps of:

plastic working a laminated austenite stainless steel product having a laminated structure in which an austenite stainless steel plate with a nickel content of 8 mass % or more is sandwiched between austenite stainless steel plates with a nickel content less than 8 mass %, and generating a martensite phase in the austenite stainless steel of the laminated austenite stainless steel product.

13. The method according to claim 12, wherein a working rate in terms of a thickness of the laminated austenite stainless steel product in the plastic working, is at least 40%.

14. The method according to claim 12, wherein the laminated austenite stainless steel product is a rolled clad material obtained by rolling a laminated steel plate having a laminated structure in which a layer comprising a martensite phase, with a nickel content of 8 mass % or more is sandwiched between layers each comprising a martensite phase, with a nickel content less than 8 mass %.

* * * * *